G. P. THOMAS.
METAL WORK MACHINE.
APPLICATION FILED FEB. 13, 1908.

908,818. Patented Jan. 5, 1909.
6 SHEETS—SHEET 3.

WITNESSES:
J. Herbert Bradley.
Charles Barnett.

INVENTOR
George Paul Thomas
by Christy and Christy
Attys.

G. P. THOMAS.
METAL WORK MACHINE.
APPLICATION FILED FEB. 13, 1908.

908,818.

Patented Jan. 5, 1909.
6 SHEETS—SHEET 4.

WITNESSES:
J. Hobart Bradley
Charles Barnett

INVENTOR
George Paul Thomas
by Christy and Christy
Atty

G. P. THOMAS.
METAL WORK MACHINE.
APPLICATION FILED FEB. 13, 1908.

908,818.

Patented Jan. 5, 1909.
6 SHEETS—SHEET 5.

WITNESSES:
J. Herbert Bradley
Charles Barnes

INVENTOR
George Paul Thomas
by Christy and Christy
Atty.

G. P. THOMAS.
METAL WORK MACHINE.
APPLICATION FILED FEB. 13, 1908.

908,818.

Patented Jan. 5, 1909.
6 SHEETS—SHEET 6.

WITNESSES:
J. Herbert Bradley.
Charles Barnett.

George Paul Thomas INVENTOR
by Christy and Christy
Attys

UNITED STATES PATENT OFFICE.

GEORGE PAUL THOMAS, OF PITTSBURG, PENNSYLVANIA.

METAL-WORK MACHINE.

No. 908,818.　　　Specification of Letters Patent.　　　Patented Jan. 5, 1909.

Application filed February 13, 1908. Serial No. 415,692.

*To all whom it may concern:*

Be it known that I, GEORGE PAUL THOMAS, residing at Pittsburg, in the county of Allegheny and State of Pennsylvania, a citizen of the United States, have invented or discovered certain new and useful Improvements in Metal-Work Machines, of which improvements the following is a specification.

In Letters Patent No. 835,123 dated November 6th, 1906 and No. 886,551, dated May 5th, 1908, I have described and claimed certain improvements in tool operating machines whereby the article operated on is shifted to predetermined positions where it is acted on by the tool such positions being determined by suitable templets controlling the mechanism for stopping and locking the work-carrier.

The invention described and claimed herein has for its object certain improvements in the stopping and locking mechanism whereby the work-carrier may be stopped and locked without any material shock or jar to the mechanism.

The invention is hereinafter more fully described and claimed.

Figure 1:
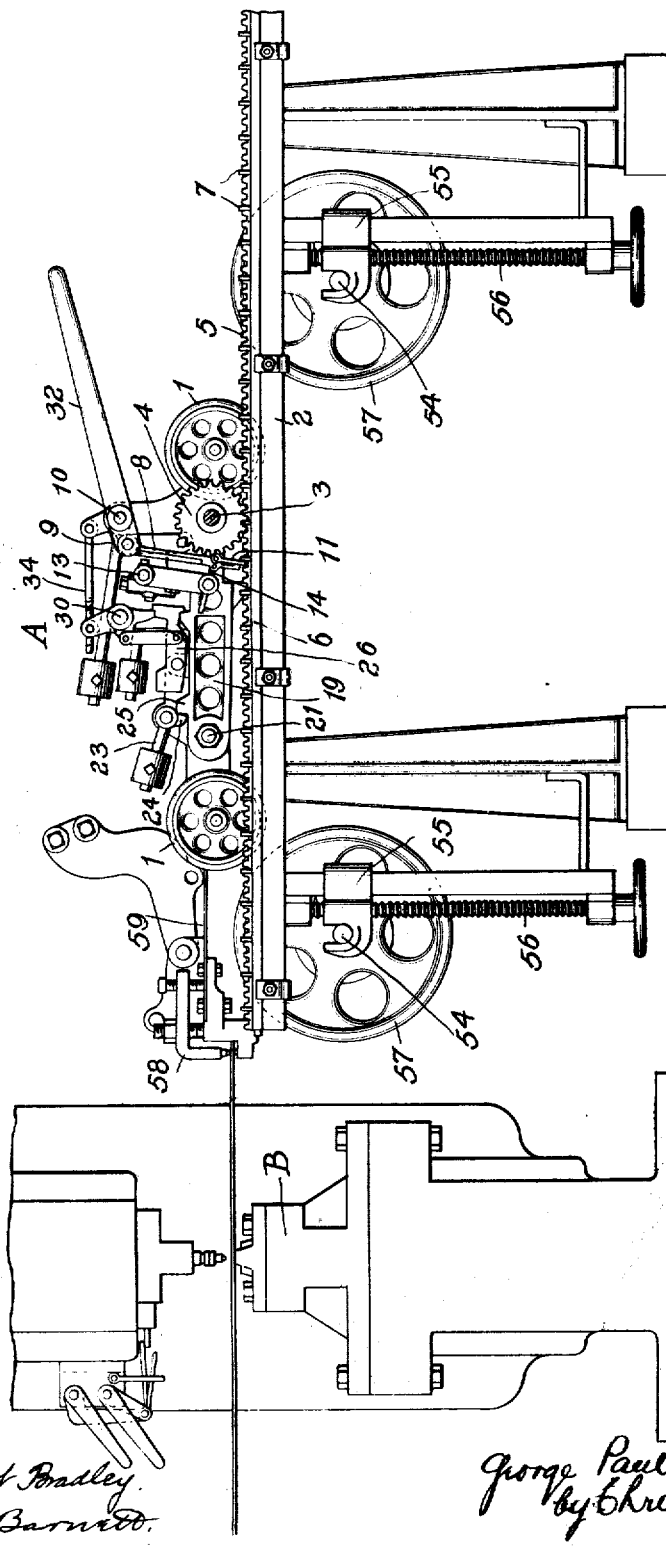
Figure 2:
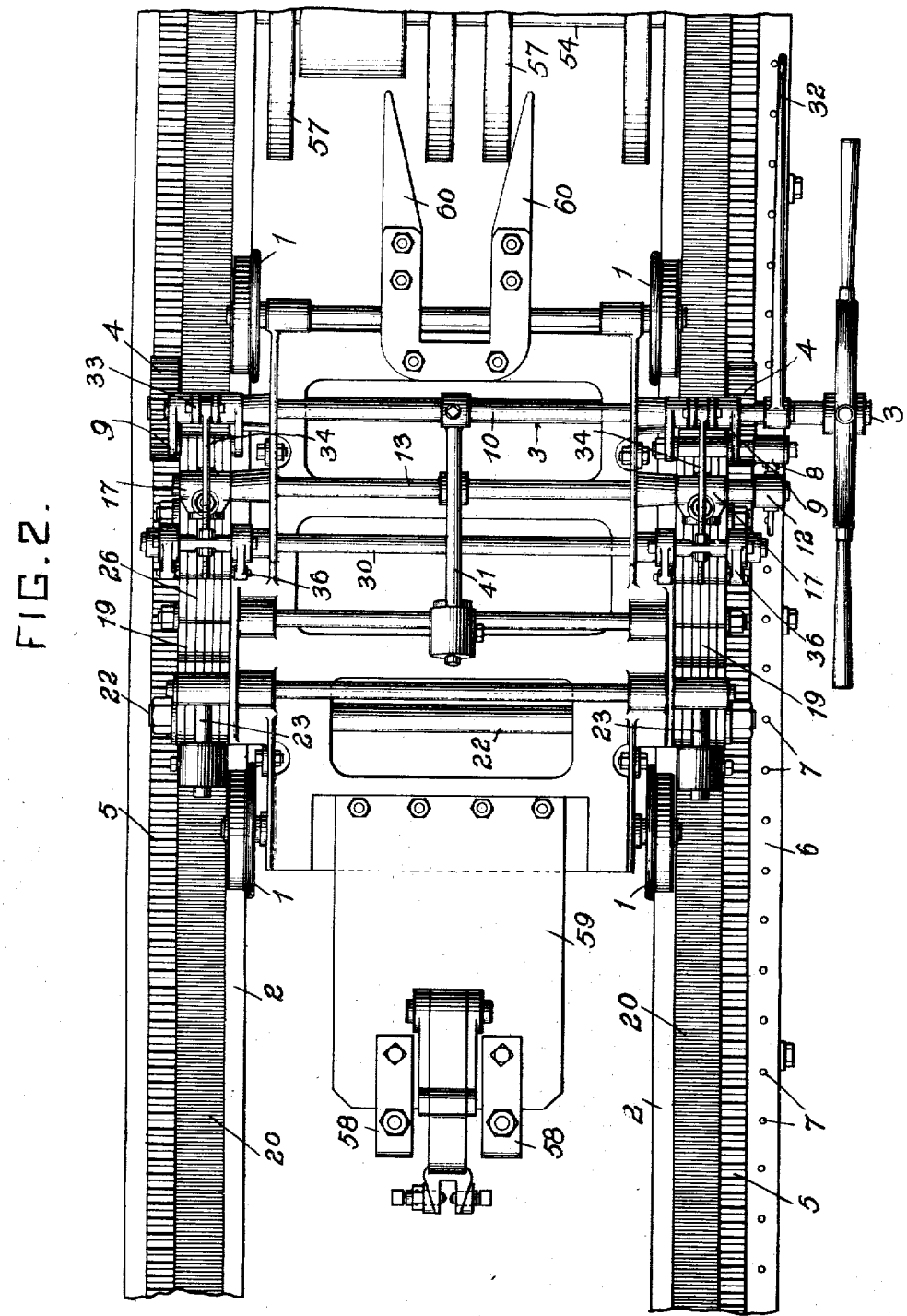
Figure 3:
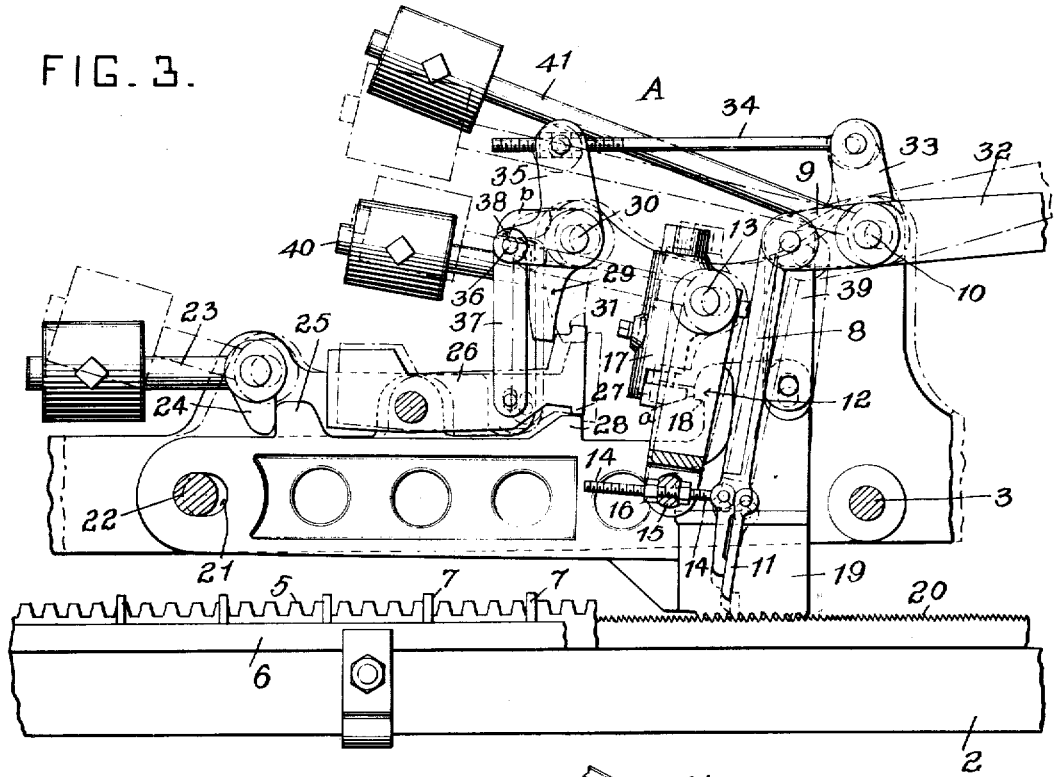
Figure 4:
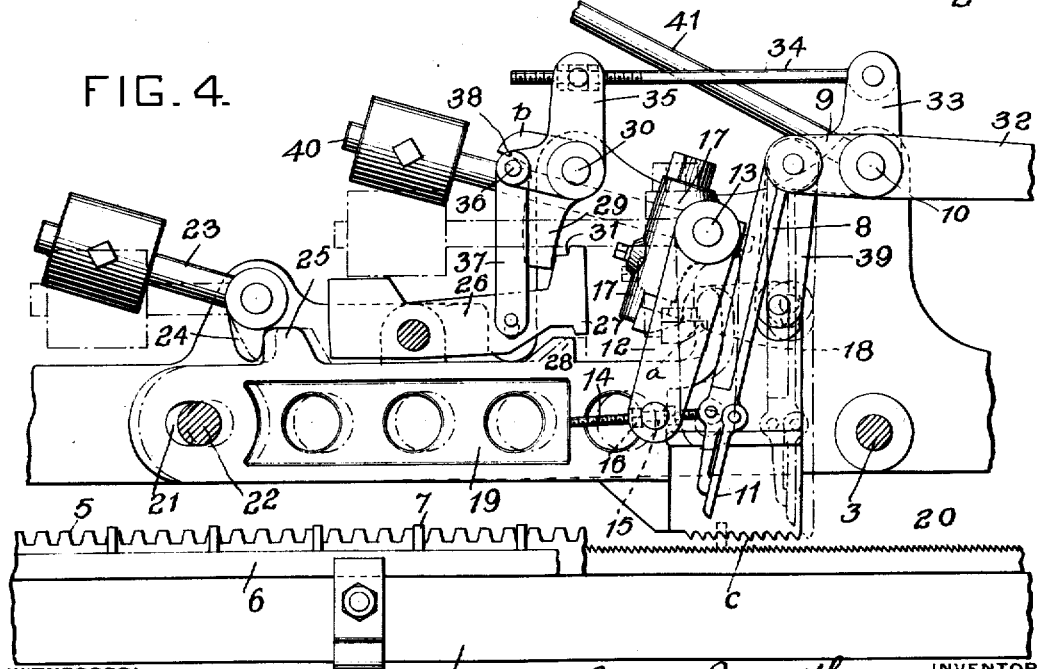
Figure 5:
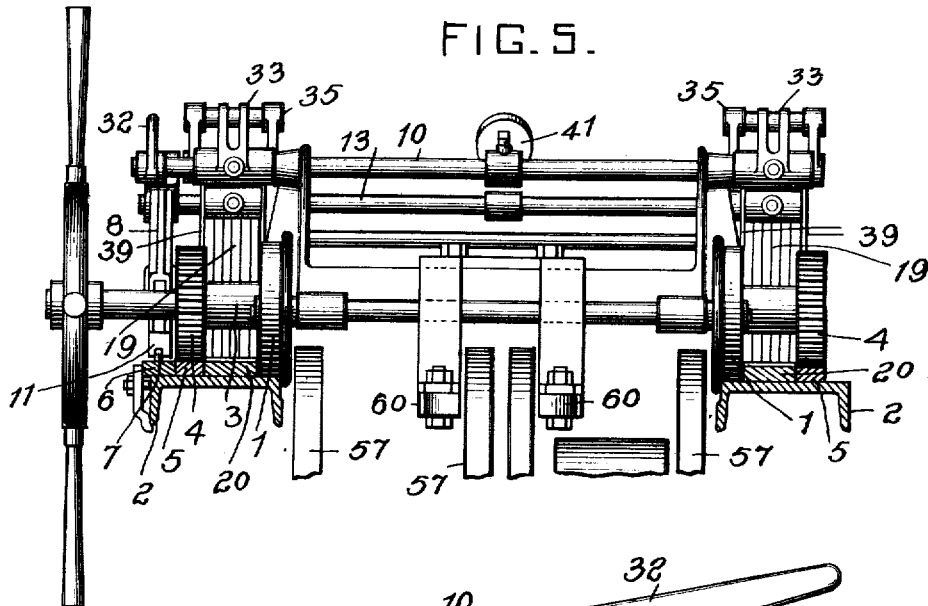
Figure 6:
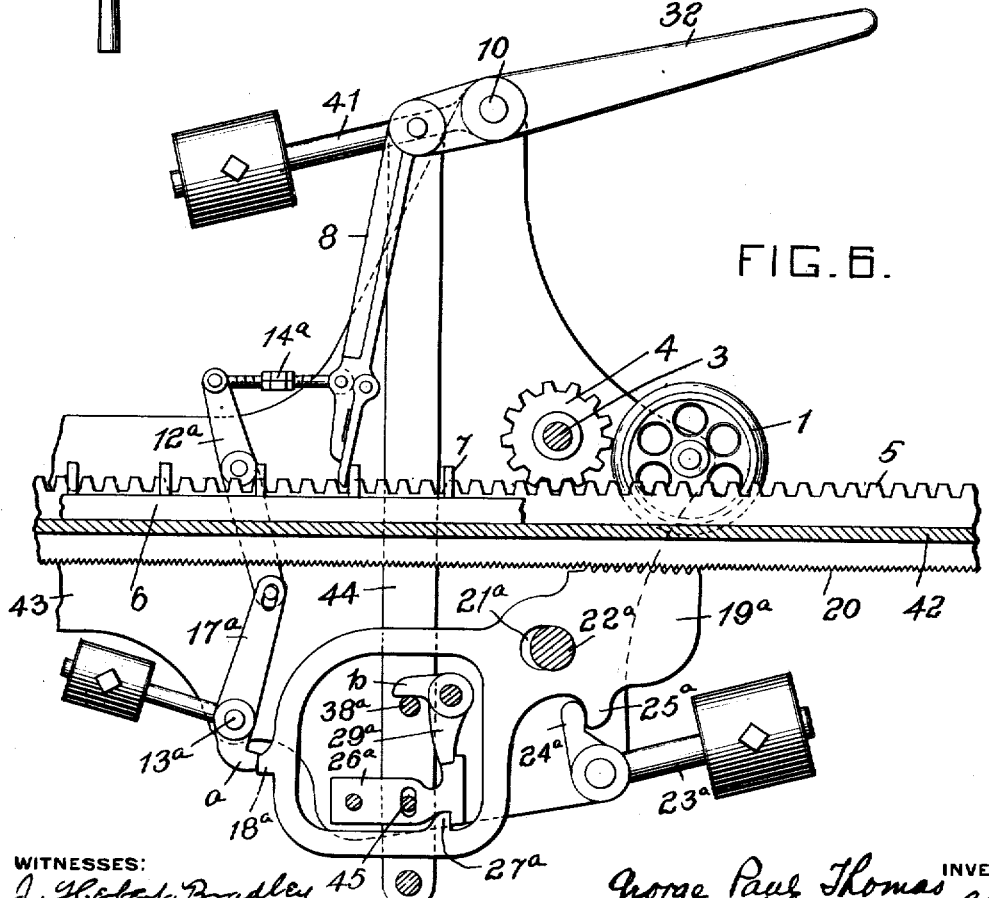
Figure 7:
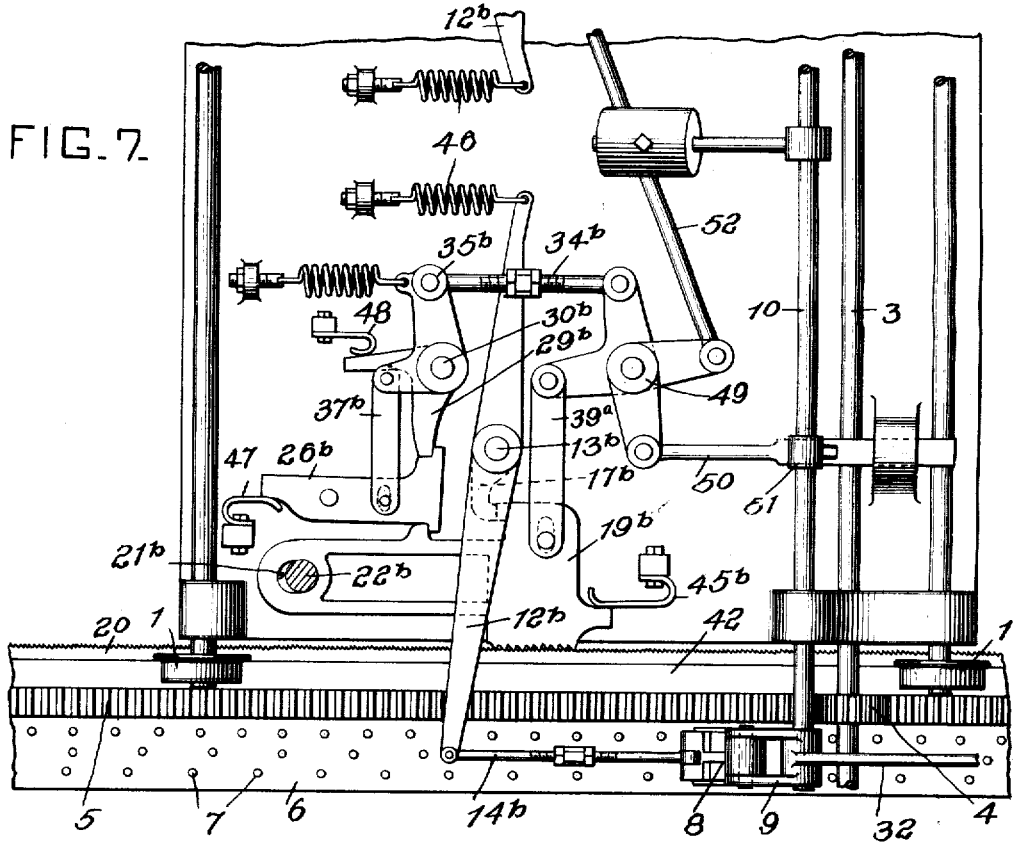
Figure 8:
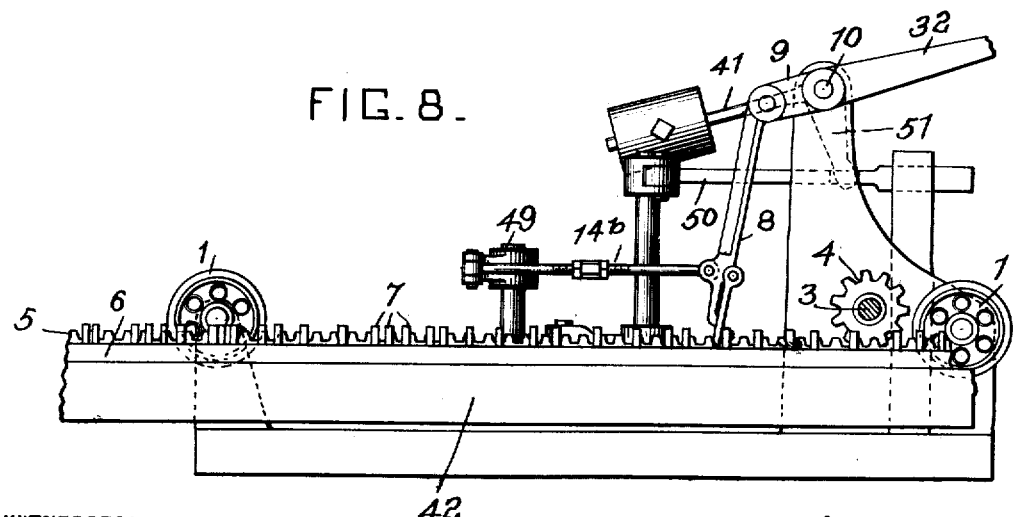
Figure 9:
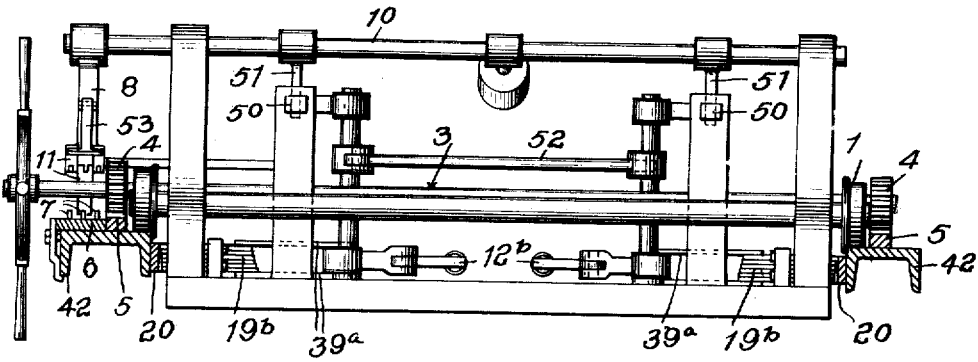
Figure 10:
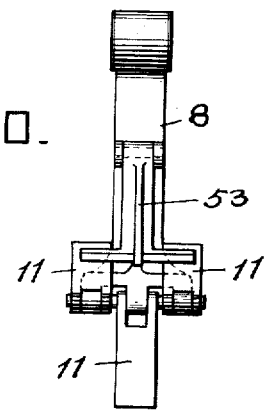
Figure 11:
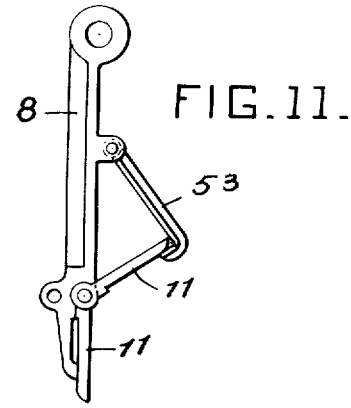
Figure 12:
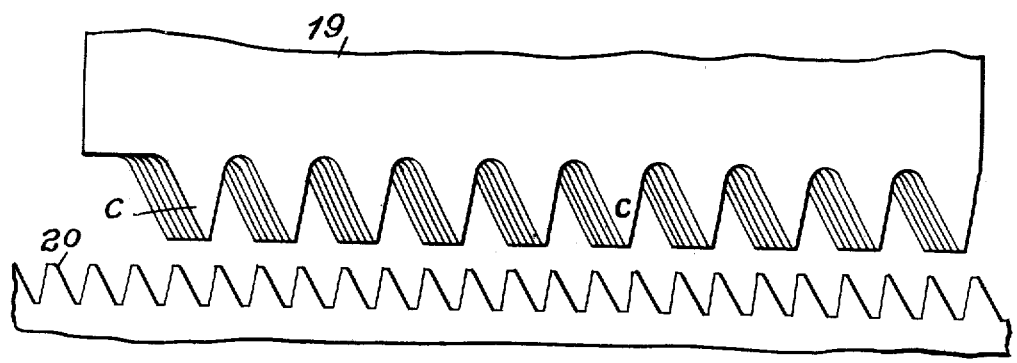

In the accompanying drawings forming a part of this specification, Figure 1 is a side elevation of a punching machine and the driven portion or member of the work-carrier, the other portion of such carrier being movable and controlled by the driven member of the work-carrier; Fig. 2 is a top plan of the operating or controlling member of the work-carrier on an enlarged scale; Figs. 3 and 4 are side elevations of the parts shown in Fig. 2 showing the locking and stopping devices in operative and inoperative positions respectively. Fig. 5 is an end elevation of the controlling member of the work-carrier; Fig. 6 is a side elevation showing a modification of the locking and stopping devices. Fig. 7 is a top plan and Fig. 8 is a side elevation showing a further modification of the locking and stopping devices. Fig. 9 is a view similar to Fig. 5 illustrating certain modifications in the machine. Figs. 10 and 11 are detail views illustrating the construction of tripping fingers shown in Fig. 9, and Fig. 12 is an enlarged view showing the construction of the detent and rack.

As shown in the Letters Patent and application referred to, the work-carrier consists of two carriages movable on tracks arranged on opposite sides of the tool B, which may be a punch, shear or other metal working tool. One of the carriages (not shown herein) is connected to one end of the article operated on and partakes of the movements imparted to the article by the driving and controlling carriage A connected to the opposite end of the article. The frame of the carriage A is carried by wheels 1, mounted on the rails 2, along which the carriage is shifted by a hand or power operated shaft 3 having pinions 4 keyed thereon, and intermeshing with racks 5 parallel with the rails 2.

While for convenience my improvement is shown and described in connection with a punching machine, it will be understood that such improvements are equally applicable for use in connection with other metal working tools.

The movement of the carriage is controlled by a templet 6 movably secured parallel with the rails and provided with pins or other suitable form of stops 7 spaced in accordance with the desired spacing of the holes in the sheet or other article. These pins or stops project into the path of movement of trip finger 8 pivotally connected to an arm 9 keyed to a shaft 10 mounted in suitable bearings in the frame of the machine. It is preferred that the finger should be provided with a paddle 11 pivotally mounted on the finger 8 in such manner that when the carriage is moved in one direction the finger will be shifted by the engagement of the paddle with the pins or stops, but the paddle will swing on its pivotal support and pass over the pins without shifting the arm, when the carriage is moved in the opposite direction.

The finger 8 is connected to an arm 12 secured to a shaft 13. The connections between the finger 8 and arm 12 is preferably adjustable, a desirable construction consisting of a threaded rod 14 pivoted on the finger 8 and passing loosely through a block 15 pivotally mounted on the arm 12 and through nuts 16 bearing in opposite sides of the block. The arm 12 when shifted as described turns the shaft 13 which in turn will shift catches 17 out of engagement with shoulders 18 on the detents 19. It is preferred that the hook portion of the catches should be made adjustable as shown. The detents 19, preferably one on each side of the carriage are provided with teeth adapted when the detents drop to engage two lines of teeth 20 parallel with the rails 2, and are so pivoted to the frame of the carriage as to permit of some movement of the latter after the detents engage the teeth 20. This relative movement of the carriage can be attained by elongating the holes 21 in the detents through which the pivotal shaft 22 passes. The detents are yieldingly held in a position where the shaft is at the near ends of the slots 21, by any suitable means such for example as that shown consisting of a weighted lever 23 pivotally mounted on the carriage and provided with toes 24 bearing in shoulders 25 on the detents. These weighted levers normally hold the detents in the position shown in Fig. 3. As soon as the detents are released by the engagement of the arm 8 with a pin in the templet, the detents will drop into engagement with the teeth 20 and be held stationary while the carriage will be free to continue its movement until the shaft 22 reaches the ends of the slots 21. This continued movement of the carriage is resisted by the weighted levers 23 which will be raised by the movement of the carriage relative to the detents. The slowing effect will be proportional to the weights in the levers. As the carriage or detents might be shifted by the tendency of the weight to return said parts to normal relative positions, means are provided for locking the detents in engagement with the teeth and for locking the carriage and detent as against any relative movements. A convenient construction to this end consists of fingers 26 pivotally mounted on the carriage and provided with lugs 27 adapted to drop in front of shoulders 28 on the detents when the carriage has reached a position having its shaft 22 bearing against the forward end of the slots 21 in the detents so that carriage will thereafter be locked to the detents from forward movement by the shaft bearing against the front end wall of the slots, and from rearward movement by the lugs engaging the shoulders 28. Means are provided for locking the lugs in engagement with the shoulders 28 and the detents in engagement with the teeth 20. While not necessary it is preferred that the same device should be employed for both functions. A convenient construction to that end consists of triggers 29 pivotally mounted on shaft 30 in such manner that when the fingers 26 have dropped to position where the lugs engage the shoulders 28, the triggers will swing forward until their ends engage notches 31, on the upper edges of fingers 26 thereby holding said fingers down with their lugs in engagement with the shoulders 28 and through said fingers holding the detents in engagement with the teeth 20.

The release of the carriage from the detents to allow said part to assume normal positions relative to each other and also the release of the detent from the teeth 20 and the lifting of the paddle clear of the pins 7 on the templet are preferably effected by a single lever or handle although said functions can be separately effected. A lever or handle 32 is secured to shaft 10 and by depressing this handle the shaft is turned to raise the trip fingers 8 above the pins 7. Arms 33 on the shaft 10 are adjustably connected by rods 34 to arms 35 on shaft 30, said arms being provided with lugs 36, which are connected by links 37 to the fingers 26. The connection of the links to the fingers is so constructed, i. e., a pin and slot that the arms 36 will have some movement prior to lifting the fingers for the purpose of permitting the triggers 29 being first shifted from engagement with the fingers. This shifting of the triggers is effected by means of pins 38 on the arms 35 engaging angular extensions b of the triggers 29 during the first movement of the arms 35. After the triggers have been shifted and the fingers 26 raised, such movement being practically simultaneous with the lifting of the tripping finger 8, the detents are raised, the detents having a pin and slot connection with links 39 which are connected to arm 9 and a similar arm on the shaft 10 adjacent to the opposite end of the latter. As soon as the detents are raised they will be shifted to normal position relative to the carriage by the weighted levers 23, and the detents will be locked in raised position by the catches 17 which will be forced forward by the weight 40. The forward movement of the catches will swing the tripping fingers 8 forward to operative position, and the fingers will be lowered into position to be again shifted by pins 7 by the reverse rotation of shaft 10 by weighted arm 41. This reverse movement of shaft 10 permits of the release of the fingers 26 and locking triggers 29 from their unlocking devices.

It will be understood that as shown and described in Letters Patent No. 835,123 an electric or other suitable motor may be employed for shifting the carriage and also the electrically controlled means can be employed for shifting the shaft 10 as set forth in said patent. In the Letters Patent referred to provision is made for a close adjustment of the carriage such adjustment being effected by forming the detents with a plurality of sections (six in the construction shown), the teeth on the several sections being staggered as shown in Fig. 12. It will be seen that the teeth c on each detent section are spaced a distance apart equal to twice the distance between adjacent teeth 20 on the carriage supporting frame so that teeth $c$ will engage alternate teeth 20. The teeth on adjacent sections are so formed that in the construction shown there will be six teeth to engage to a tooth 20 in half the distance between two adjacent teeth 20. In the construction shown the teeth 20 are represented as being three sixteenths of an inch apart so that a tooth of one of the detents will engage a tooth 20 for a movement of the carriage equal to a thirty-second of an inch. Hence the holes can be punched in the plate or other article within at most a thirty second of an inch of desired point.

As shown in Fig. 6 the mechanism for stopping the carriage can be so constructed that the teeth 20 may be arranged on the underside of the longitudinal members or channels 42 supporting the carriage or along the inner edges of the same as shown in Figs. 7 and 8, thus avoiding in either construction such a clogging of the teeth 20 as would prevent the teeth of the detent properly engaging the same.

In Fig. 6 the teeth 20 are arranged on the underside of the members 42 and the detents $19^a$ are connected to the frame of the carriage by a shaft $22^a$ secured in the depending web 43 of the carriage and having its ends extending through slots $21^a$ in the detents. In this construction the weight of the rear end of the detent tends to cause the detent to turn on the shaft and bring its teeth into engagement with the teeth 20. This movement of the detent is prevented, except as hereinafter stated, by a catch $17^a$ pivotally mounted on shaft $13^a$ and provided with a hook $a$ adapted to engage a shoulder $18^a$ on the detent. This catch is shifted to release the detent by the tripping finger 8 which is adjustably connected by a rod $14^a$ to one end of a lever $12^a$, the opposite end thereof being connected to the catch. The carriage is locked to the detents from movement in one direction by the shaft $22^a$ bearing against one end of the slot $21^a$ and from movement in the other direction by finger $26^a$ engaging shoulders $27^a$ in the detents this operation being similar to that of the construction shown in Figs. 1 to 4. The fingers are locked in engagement with the detents and the latter in engagement with teeth 20 by triggers $29^a$, which are provided with angular extensions $b$. The movement of the carriage after the detents engage the teeth 20, is gradually checked by the weighted lever $23^a$, the operation being similar to that of the constructions shown in Figs. 1 to 4. The tripping fingers are raised so as to clear the pins 7 by the handle 32, and during the same movement to shift the triggers and raise the locking fingers $26^a$. To this end side bars 44 are pivotally connected to arms on the shaft 10 and carry a rod $38^a$ engaging the angular extension $b$ of the triggers and a rod 45 engaging a slot in the fingers $26^a$ such construction permitting the shifting of the triggers prior to the lifting of the fingers.

In the construction in Figs. 7 and 8 the teeth 20 are arranged along the inner edges of the channel or member 42 and the detents and their locking devices move horizontally. The detents $19^b$ have slots $21^b$ adjacent to their rear ends for the reception of the pivotal pins $22^b$ secured to the carriage. The detents are shifted to engage the teeth 20 by a spring $45^b$. The catch $17^b$ for holding the detents away from the teeth 20 are secured to vertical shafts $13^b$, to which levers $12^b$ are also secured. One end of these levers is adjustably connected to the tripping finger 8 by a rod $14^b$ and the opposite ends are connected to springs 46 to cause the catches to engage the detents and to return the tripping finger to operative position. The fingers $26^b$ are shifted to engage the detents by springs 47. The triggers $29^b$ are shifted to lock the fingers $26^b$ by springs 48 connected to the angular extensions $b$ on the triggers. The shaft 10 is shifted by the handle 32 to raise the tripping finger clear of the pins 7. By the same movement of the shaft multiple lever 49 is shifted, said lever having one of its arms connected to a rod 50, which is moved by an arm 51 on the shaft 10 projecting into a slot in the rod. One of the arms of the multiple lever is connected to a rod 52 to a corresponding arm on a similar lever (not shown), for operating the devices on the opposite side of the carriage. One arm of each of the multiple levers is connected by links $39^a$ to the detents and other arms of the levers have adjustable connections by rods $34^b$ to arms $35^b$ on the shafts $30^b$.

As shown in Fig. 9 the templet may have two or more series of differently spaced pins 7, and the tripping finger 8 provided with two or more paddles 9. When one series of pins is being used the paddles in line with the other series will be held in inoperative position by a hook 53 as clearly shown in Figs. 10 and 11.

In operating on long sheets or other articles it is desirable to provide supports intermediate of the carriages. To this end shafts 54 are supported in blocks 55 vertically adjustable by means of threaded rods 56. Wheels 57, generally three in number, are loosely mounted on the shafts and form edge and intermediate supports for the sheet.

Gripping jaws 58 the shape and construction of which will vary with article operated on, are secured to the carriages by plates 59 in any suitable manner. As parts of these jaws will project below the level of the sheet or other article as shown in Fig. 1 and might therefore strike against the intermediate supporting wheel, tapering prongs 59 are secured to the front of the carriage and in line with the gripping jaws to shift the intermediate wheel along its shaft out of line with the gripping jaws.

I claim herein as my invention:

1. In a tool operating machine, the combination of a stationary and a movable member, a lock mechanism for connecting said members without interrupting the movement of the movable member and means for gradually checking the movement of the movable member.

2. In a tool operating machine, the combination of a stationary and a movable member, a detent movably mounted on one member and adapted to engage the other member without averting the movement of the movable member and means interposed between the detent and the movable member for gradually checking the movement of the latter.

3. In a tool operating machine, the combination of a stationary and a movable member, a detent carried by one member and adapted to engage the other member without averting the movement of the movable member and means interposed between the detent and the movable member for applying a progressively increasing retarding force to the movable member.

4. In a tool operating machine, the combination of a stationary and a movable member, a detent so mounted on the movable member that the latter can move independent of the detent and adapted to engage the stationary member, a weight carried by the movable member and means operative by the detent when in engagement with the stationary member to shift said weight and thereby gradually check the movement of the movable member.

5. In a tool operating machine, the combination of a stationary frame provided with a series of suitably spaced pins, a carriage movable along the frame, a detent mounted on the carriage and adapted to engage teeth on the frame, means for locking the detent in engagement with said teeth and a tripping finger shiftable by the pins and controlling the detent and lock.

6. In a tool operating machine, the combination of a stationary frame, a carriage movable along the frame, a detent so mounted in the carriage that the latter can move independent of the detent when in engagement with the frame means interposed between the detent and carriage for gradually retarding the movement of the latter and means for locking the detent and carriage as against relative movement.

7. In a tool operating machine, the combination of a stationary frame provided with a series of suitably spaced pins, a carriage movable along the frame, a detent mounted on the carriage and adapted to engage teeth on the frame, means for locking the carriage and detent as against relative movement, means for locking the detent and carriage lock, a tripping finger shiftable by the pins and controlling the detent and means for successively shifting the finger, the detent and carriage locks, and the detent.

8. In a tool operating machine, the combination of a frame, a carriage movable along the frame, means for locking the carriage to the frame, two or more series of differently spaced pins on the frame and a tripping finger controlling said lock and adapted to be shifted by either of said series of pins.

9. In a tool operating machine, the combination of a frame, a carriage movable along the frame, means for locking the carriage to the frame two or more series of differently spaced pins on the frame, a tripping finger mounted on the carriage, and two or more paddles movably mounted on the finger and means for holding one or more of the paddles in inoperative position.

In testimony whereof, I have hereunto set my hand

GEORGE PAUL THOMAS.

Witnesses:
CHARLES BARNETT,
FRANCIS J. TOMASSON.